United States Patent
Horan et al.

(10) Patent No.: US 10,237,127 B1
(45) Date of Patent: Mar. 19, 2019

(54) UNIFIED INITIALIZATION UTILITY

(71) Applicant: EMC Corporation, Hopkinton, MA (US)

(72) Inventors: Seth B. Horan, Wrentham, MA (US); Kendra Marchant, Arlington, MA (US); Domenic Joseph LaRosa, Atkinson, NH (US); Michael Richard Turco, Uxbridge, MA (US); Nidhish Chandran Ramachandran, Kerala (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1745 days.

(21) Appl. No.: 13/630,093

(22) Filed: Sep. 28, 2012

(51) Int. Cl.
*H04L 7/10* (2006.01)
*H04L 12/24* (2006.01)
*H04L 7/00* (2006.01)
*H04L 25/03* (2006.01)

(52) U.S. Cl.
CPC ........ *H04L 41/0806* (2013.01); *H04L 7/0004* (2013.01); *H04L 7/0075* (2013.01); *H04L 7/10* (2013.01); *H04L 2025/03656* (2013.01)

(58) Field of Classification Search
CPC .............. H04L 29/06; H04L 29/08981; H04L 29/08072; H04L 29/0806; H04L 41/0806; H04L 2025/03656; H04L 7/0004; H04L 7/0075; H04L 7/10; G06F 9/4416
USPC ................................ 709/222; 710/104; 712/2
See application file for complete search history.

(56) References Cited

U.S. PATENT DOCUMENTS

| | | | |
|---|---|---|---|
| 6,606,690 B2 * | 8/2003 | Padovano | G06F 11/201 709/213 |
| 8,086,760 B1 * | 12/2011 | Gruttadauria | H04L 69/16 710/16 |
| 8,255,659 B1 * | 8/2012 | Pattar | G06F 3/0607 711/114 |
| 8,301,739 B1 * | 10/2012 | Krishnan et al. | 709/222 |
| 8,504,684 B1 | 8/2013 | Ballantyne et al. | |
| 2002/0029256 A1 * | 3/2002 | Zintel et al. | 709/218 |
| 2002/0161596 A1 * | 10/2002 | Johnson | G06Q 10/10 705/1.1 |

(Continued)

*Primary Examiner* — John M Macilwinen
*Assistant Examiner* — Mehulkumar J Shah
(74) *Attorney, Agent, or Firm* — BainwoodHuang

(57) ABSTRACT

A method includes (a) receiving from several different storage systems, several discovery packets, each different type of system having a different minimal amount of configuration information required to initialize, (b) displaying an identifier for each system from which a discovery packet was received, (c) receiving a selection of a particular system, (d) determining which type of system the selected system is, each type being associated with a distinct set of initialization parameter selection choices reflecting the minimal amount of configuration information required to initialize a system of that type, (e) displaying the initialization parameter selection choices associated with the determined type of system, (f) receiving initialization parameter selections responsive to the displayed initialization parameter selection choices, and (g) sending an initialization command to the selected particular system including the received initialization parameter selections to allow the selected particular system to be properly initialized.

17 Claims, 6 Drawing Sheets

(56) References Cited

U.S. PATENT DOCUMENTS

| | | | |
|---|---|---|---|
| 2003/0149753 A1* | 8/2003 | Lamb | G06F 3/0601 709/223 |
| 2005/0021908 A1* | 1/2005 | Ohno | G06F 3/0605 711/114 |
| 2005/0195660 A1* | 9/2005 | Kavuri | G06F 3/0605 365/189.05 |
| 2005/0203910 A1* | 9/2005 | Taguchi | G06F 3/0605 |
| 2005/0234941 A1* | 10/2005 | Watanabe | 707/100 |
| 2006/0155928 A1* | 7/2006 | Mimatsu | G06F 3/0607 711/112 |
| 2007/0055797 A1* | 3/2007 | Shimozono | G06F 11/2005 710/36 |
| 2009/0198805 A1* | 8/2009 | Ben-Shaul | G06F 9/4416 709/222 |
| 2011/0185130 A1* | 7/2011 | Hara | G06F 3/0605 711/154 |
| 2012/0011329 A1* | 1/2012 | Nonaka | G06F 3/0604 711/154 |
| 2012/0278584 A1* | 11/2012 | Nagami | G06F 3/0607 711/170 |
| 2013/0036256 A1* | 2/2013 | Kawamura | G06F 3/0623 711/103 |
| 2013/0286895 A1* | 10/2013 | Mittapalli | H04L 69/324 370/255 |

* cited by examiner

Fig. 7B

Please enter initialization parameter values for the selected system (12345):

Protocol: IPV4 ▽ / IPV6

SP A
- Hostname:
- IP address:
- Subnet Mask:
- Gateway:

SP B
- Hostname:
- IP address:
- Subnet Mask:
- Gateway:

Submit

Fig. 7C

Please enter initialization parameter values for the selected system (12347):

Protocol: IPV4 ▽ / IPV6

SP A
- Hostname:
- IP address:
- Subnet Mask:
- Gateway:

SP B
- Hostname:
- IP address:
- Subnet Mask:
- Gateway:

Primary Control Station
- Hostname:
- IP address:
- Subnet Mask:
- Gateway:

Secondary Control Station
- Hostname:
- IP address:
- Subnet Mask:
- Gateway:

Submit

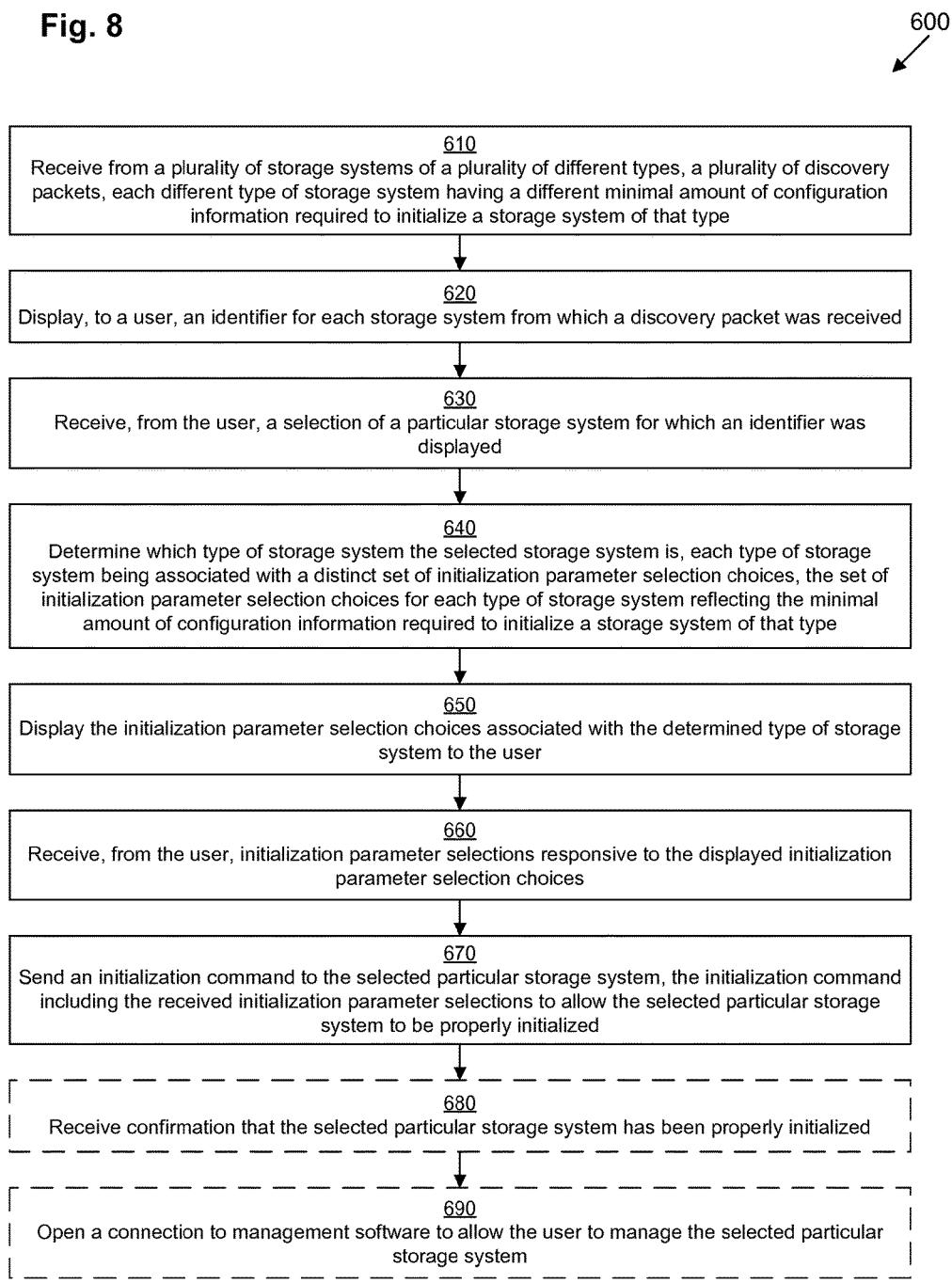

UNIFIED INITIALIZATION UTILITY

BACKGROUND

An enterprise may utilize a collection of data storage systems to store a large collection of data on its network. An enterprise administrator may initialize each of these data storage systems by running a software initialization utility on a remote machine. The software initialization utility is configured to allow the administrator to communicate initialization parameters to the data storage systems so that they can be initialized.

SUMMARY

The above-described approach may suffer from deficiencies. For example, in the conventional approach, different data storage systems may operate according to different protocols, each requiring a separate software initialization utility. Thus, unless the enterprise administrator obtains all storage systems of the same type, he must use a collection of different software initialization utilities to initialize all of the storage systems.

Thus, techniques are presented for an administrator to initialize a diverse collection of data storage systems from a single unified initialization utility. The unified initialization utility receives discovery packets from the diverse collection of data storage systems and intelligently determines which type of storage system a particular storage system is. The unified initialization utility then queries the administrator for the proper initialization parameters for a storage system of that type, prior to sending an initialization command in the proper format for a storage system of that type.

In one embodiment, a method performed by a management computer is described. The method includes (a) receiving, at the management computer, via a network connection, from a plurality of storage systems of a plurality of different types, a plurality of discovery packets, each different type of storage system having a different minimal amount of configuration information required to initialize a storage system of that type, (b) displaying to a user of the management computer, an identifier for each storage system from which a discovery packet was received, (c) receiving, at the management computer, from the user, a selection of a particular storage system for which an identifier was displayed, (d) determining, at the management computer, which type of storage system the selected storage system is, each type of storage system being associated with a distinct set of initialization parameter selection choices, the set of initialization parameter selection choices for each type of storage system reflecting the minimal amount of configuration information required to initialize a storage system of that type, (e) displaying the initialization parameter selection choices associated with the determined type of storage system to the user of the management computer, (f) receiving, at the management computer, from the user, initialization parameter selections responsive to the displayed initialization parameter selection choices, and (g) sending an initialization command from the management computer to the selected particular storage system via the network connection, the initialization command including the received initialization parameter selections to allow the selected particular storage system to be properly initialized. A corresponding apparatus and computer program product are also described.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIGS. 7A, 7B, and 7C depict example display pages used in various embodiments.

FIG. 8 depicts an example method of various embodiments.

DETAILED DESCRIPTION

Embodiments of the invention are directed to techniques for an administrator to initialize a diverse collection of data storage systems from a single unified initialization utility. The unified initialization utility receives discovery packets from the diverse collection of data storage systems and intelligently determines which type of storage system a particular storage system is. The unified initialization utility then queries the administrator for the proper initialization parameters for a storage system of that type, prior to sending an initialization command in the proper format for a storage system of that type.

Figure 1:
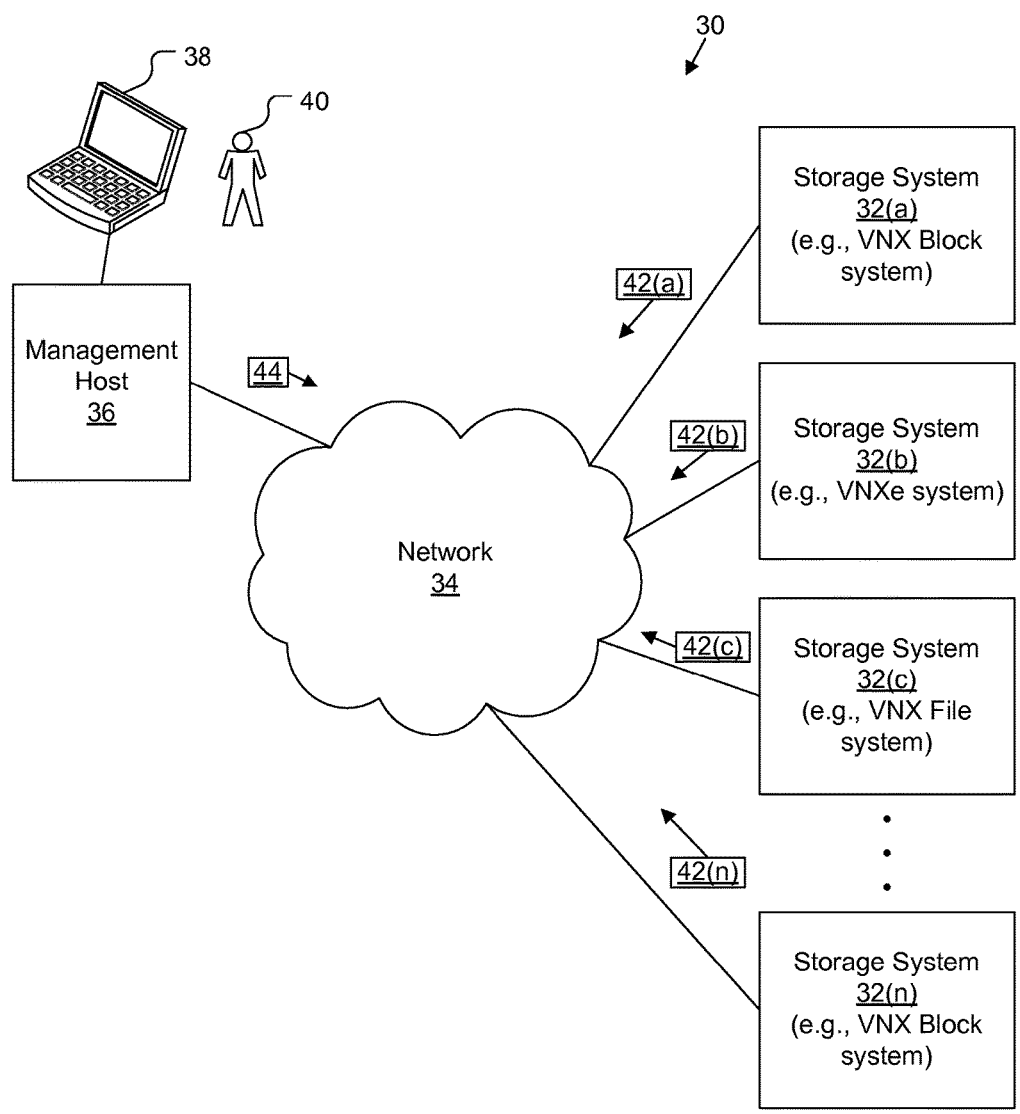
FIG. 1 depicts an example system for use in performing various embodiments.

FIG. 1 depicts an example system 30 for use in performing various embodiments. System 30 includes a set of data storage systems 32. Each data storage system 32 provides data storage to remote hosts on network 34. System 30 includes at least two different kinds of data storage systems 32. Each data storage system 32 may be any kind of data storage system, such as for example, a VNX series or VNXe series data storage system provided by the EMC Corp. of Hopkinton, Mass.

As depicted, there are n data storage systems $32(a)$, $32(b)$, $32(c)$, ..., $32(n)$. As depicted, storage system $32(a)$ is a VNX series block-based storage system. VNX block-based storage systems use block-based protocols, such as, for example, Fibre Channel or iSCSI. As depicted, storage system $32(c)$ is a VNX series file-based storage system provided by the EMC Corp. VNX file-based storage systems use file-based protocols, such as, for example, the Network File System (NFS), the Common Internet File System (CIFS), or the Multi Path File System (MPFS). VNX unified file/block storage systems are organized in a similar fashion as VNX file-based storage systems. As depicted, storage system $32(b)$ is a VNXe series file-based storage system provided by the EMC Corp. VNXe file-based storage systems also use both file-based and block-based protocols, but are organized differently than the VNX storage systems. Storage system $32(n)$ is depicted as being a VNX block-based storage system in addition to storage system $32(a)$ being a VNX block-based storage system.

Network 34 may be any kind of network or a combination of several different networks, For example, network 34 may be a local area network, a wide area network, a storage area network, an Ethernet network, a Fibre Channel network, a set of point-to-point connections, or a fabric of interconnected connections, hubs, and switches.

System 32 also includes a management host computer 36, which connects to one or more user interface devices 38 for communicating with a user 40, such as an administrator of system 30. Management host 36 may be any kind of computing device, such as, for example, a personal computer, a workstation, a server, an enterprise server, a laptop computer, a mobile computer, a smart phone, a tablet computer, etc. User 38 operates the management host 36 in order to initialize the data storage systems 32.

In operation, uninitialized storage systems 32 periodically send out (e.g., by UDP broadcast) discovery packets 42 to identify themselves as available for initialization. In some embodiments, the uninitialized storage systems 32 periodically send out the discovery packets 42 in response to the management host 36 first sending out discovery request packets. Each different type of data storage system 32(a), 32(b), 32(c) sends out a different type of discovery packet, 42(a), 42(b), 42(c), each having a different format. Example formats for discovery packets 42(a), 42(b), 42(c) are presented in detail in connection with FIGS. 3-5, below. Once management host 36 has received the discovery packets 42, user 40 is able to select one particular storage system 32 to initialize and provide initialization parameters. Management host 36 is then able to send out (e.g., by UDP broadcast) an initialization command 44 to initialize the selected storage system 32.

Figure 2:
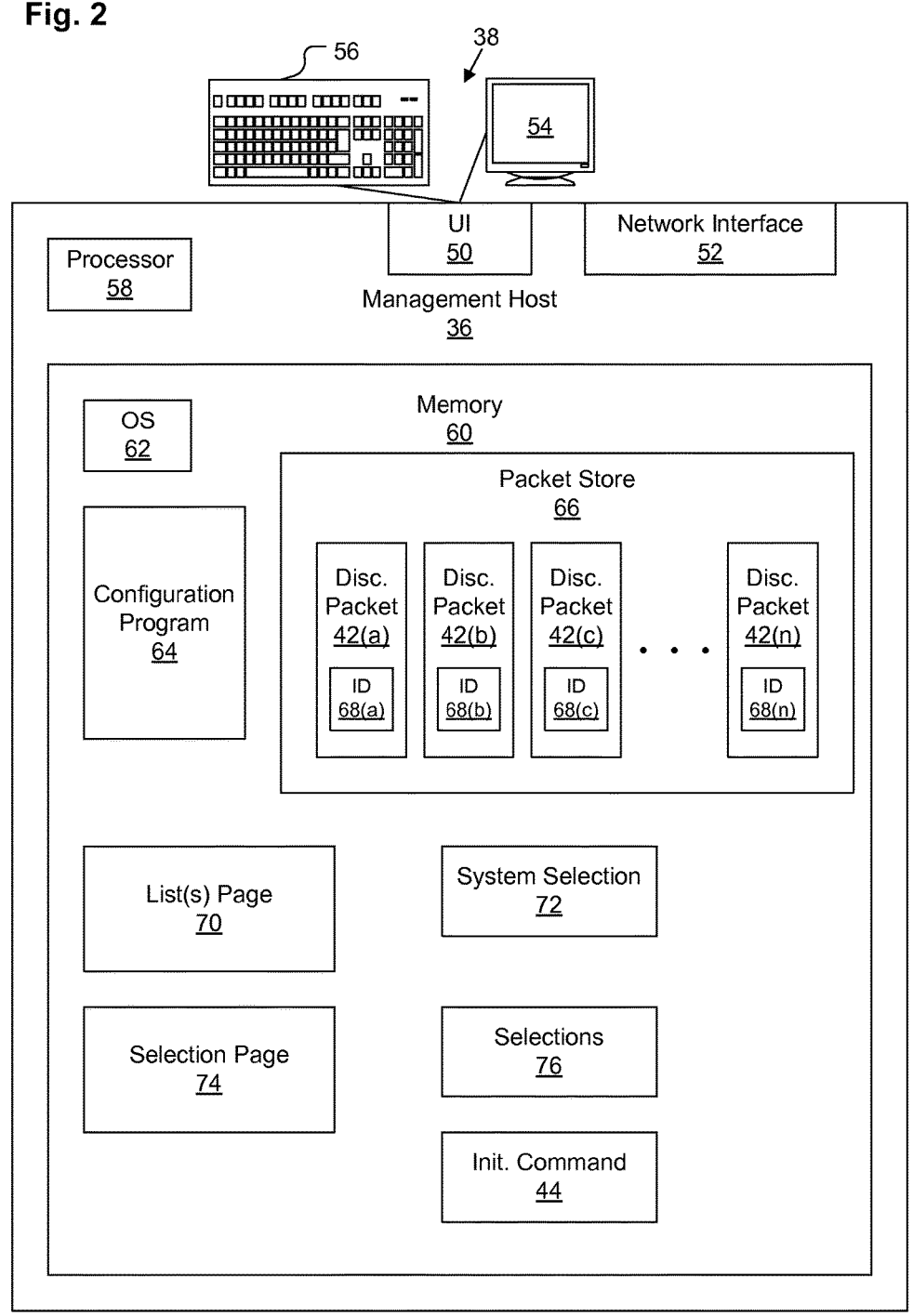
FIG. 2 depicts an example apparatus of various embodiments.

FIG. 2 depicts an example management host 36 in further detail. Management host 36 includes a network interface 52. Management host 36 is able to communicate with storage systems 32 using network interface 52. Management host 36 also contains a user interface (UI) 50 which allows management host 36 to communicate with user 40 via UI devices 38. UI 50 may be for example, one or more of the following, a graphics adapter, a serial port, a parallel port, a Universal Serial Bus adapter, etc. UI devices 38 may include input devices as well as output devices. Example UI devices 38 include a display monitor 54 and a keyboard 56. Other example UI devices 38 could include a printer, a touch screen, a mouse, etc.

Management host 36 also contains a processor 58 and memory 60. Processor 58 may be any kind of processor configured to perform operations, such as, for example, a microprocessor, a multi-core microprocessor, a digital signal processor, a collection of electronic circuits, or one or more of the above. Memory 60 may be any kind of digital memory, such as, for example, random access memory, read-only memory, static memory, volatile memory, non-volatile memory, system memory, solid-state storage, disk-based storage, or some combination of the above. Memory 60 stores programs executing on processor 58 as well as data used by those programs. Memory 60 stores an operating system 62 and a configuration program 64, both of which run on processor 58. Memory 60 typically includes both a system memory portion for storing programs and data in active use by the processor 58 as well as a persistent storage portion (e.g., solid-state storage and/or disk-based storage) for storing programs and data even while the management host 36 is powered off. OS 62 and configuration program 64 are typically stored both in system memory and in persistent storage so that they may be loaded into system memory from persistent storage upon a system restart. The configuration program 64, when stored in non-transient form in system memory, forms a computer program product.

Memory 60 also stores a packet store 66, in which it stores received discovery packets 42. Each discovery packet 42 includes a storage system identifier 68. Each storage system identifier 68 uniquely identifies a particular storage system 32. For example, the storage system identifiers 68 may be system serial numbers, uniquely assigned to each storage system 32. Memory 60 also stores a list (or lists) page 70, a system selection 72, a selection page 74, a set of selections 76, and initialization command 44.

List(s) page 70 is a page, which, when displayed to user 40 (e.g., on display 54), alerts the user as to the presence of the various storage systems 32 for which packets 42 have been received. Further details with respect to list(s) page 70 are presented below, in connection with FIGS. 6A and 6B. System selection 72 represents the selection of user 40 regarding which storage system 32 is to be initialized.

Selection page 74 is a page, which, when displayed to user 40 (e.g., on display 54), queries the user 40 for initialization parameters needed to initialize the selected storage system 32 identified by system selection 72. Further details with respect to selection page 74 are presented below, in connection with FIGS. 7A, 7B, and 7C. The set of selections 76 are the responses entered by the user 40 (e.g., using keyboard 56 and/or any input device) in response to the queries of selection page 74.

Figure 3:
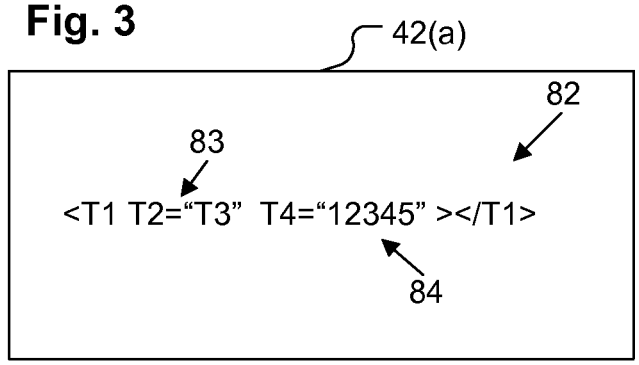
FIGS. 3, 4, and 5 depict example files used in various embodiments.

FIG. 3 depicts an example discovery packet 42(a) sent by a system such as a VNX block-based storage system 32(a). Discovery packet 42(a) includes one or more markup tags 82 encoding the data of the packet. For example, the presence of tag T1 may indicate that the packet 42(a) is a discovery acknowledgement packet, intended to announce the presence of an uninitialized storage system 32 to the network. In another embodiment, variable T2 of variable definition 83 may represent a type of packet, while value "T3" indicates that the packet 42(a) is a discovery acknowledgement packet. Variable T4 may represent the serial number 84 of the VNX block-based storage system 32(a), the serial number being set to 12345, for example. The serial number 12345 may serve as the value of storage system identifier 68(a). This encoded structure allows the discovery packet 42(a) to be presented in a very compact manner, not requiring much space.

Because VNX block-based storage system 32(a) is not yet initialized, it most likely does not yet have a network configuration. Thus, it most likely lacks an IP address, etc. It may also be unaware of the address of the management host 36. Thus, discovery packet 42(a) is typically broadcast across network 34 periodically. In some embodiments, VNX block-based storage system 32(a) periodically (e.g., once every 5 seconds) broadcasts discovery packet 42(a) for a limited amount of time (e.g., 5 minutes) after being turned on. In other embodiments, VNX block-based storage system 32(a) broadcasts discovery packet 42(a) in response to receiving a broadcast discovery request packet indicative of an attempt by user 40 to search for uninitialized storage systems 32.

Figure 4:
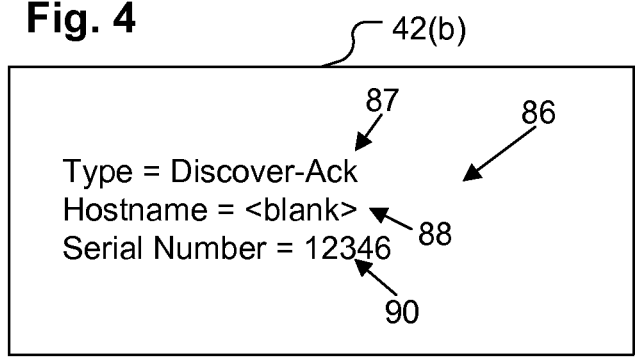

FIG. 4 depicts an example discovery packet 42(b) sent by a system such as a VNXe storage system 32(b). Discovery packet 42(b) includes a set of name-value pairs 86 that define various variables. Type variable 87 is defined to be "Discover-Ack," indicating that the packet 42(b) is a discovery acknowledgement packet, intended to announce the presence of an uninitialized storage system 32 to the network. Hostname variable 88 is blank, which confirms that the VNXe storage system 32(b) has not yet been initialized. Serial number variable 90 represents the serial number of the VNXe storage system 32(b), the serial number 90 being set to 12346, for example. The serial number 12346 may serve as the value of storage system identifier 68(b).

Because VNXe storage system 32(b) is not yet initialized, it most likely does not yet have a network configuration.

Thus, it most likely lacks an IP address, etc. It may also be unaware of the address of the management host 36. Thus, discovery packet 42(*b*) is typically broadcast across network 34 periodically. In some embodiments, VNXe storage system 32(*b*) periodically (e.g., once every 5 seconds) broadcasts discovery packet 42(*b*) for a limited amount of time (e.g., 20 minutes) after being turned on. In other embodiments, VNXe storage system 32(*b*) broadcasts discovery packet 42(*b*) in response to receiving a broadcast discovery request packet indicative of an attempt by user 40 to search for uninitialized storage systems 32.

Figure 5:
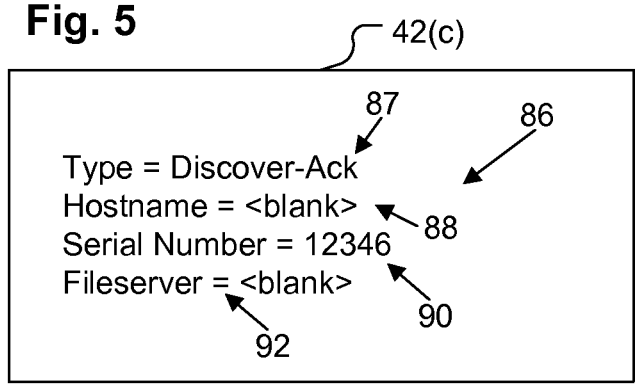

FIG. 5 depicts an example discovery packet 42(*c*) sent by a system such as a VNX file-based storage system 32(*c*). Discovery packet 42(*c*) includes a set of name-value pairs 86 that define various variables. Type variable 87 is defined to be "Discover-Ack," indicating that the packet 42(*c*) is a discovery acknowledgement packet, intended to announce the presence of an uninitialized storage system 32 to the network. Hostname variable 88 is blank, which confirms that the VNX file-based storage system 32(*c*) has not yet been initialized. Serial number variable 90 represents the serial number of the VNX file-based storage system 32(*c*), the serial number 90 being set to 12347, for example. The serial number 12347 may serve as the value of storage system identifier 68(*c*). Fileserver variable 92 is blank, which confirms that the VNX file-based storage system 32(*c*) has not yet been initialized. The presence of fileserver variable 92 also serves to differentiate between a VNXe discovery packet 42(*b*) and a VNX file-based packet 42(*c*).

Because VNX file-based storage system 32(*c*) is not yet initialized, it most likely does not yet have a network configuration. Thus, it most likely lacks an IP address, etc. It may also be unaware of the address of the management host 36. Thus, discovery packet 42(*c*) is typically broadcast across network 34 periodically. In some embodiments, VNX file-based storage system 32(*c*) periodically (e.g., once every 5 seconds) broadcasts discovery packet 42(*c*) for a limited amount of time (e.g., 15 minutes) after being turned on. In other embodiments, VNX file-based storage system 32(*c*) broadcasts discovery packet 42(*c*) in response to receiving a broadcast discovery request packet indicative of an attempt by user 40 to search for uninitialized storage systems 32.

Figure 6A:
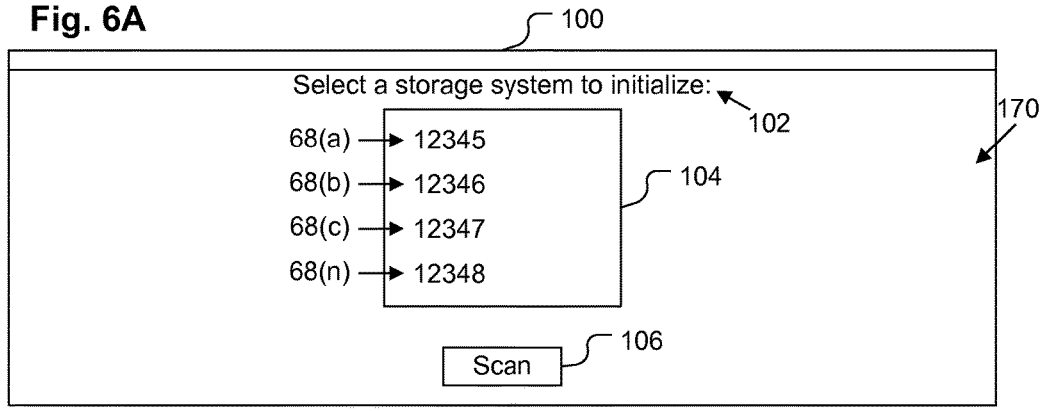
FIGS. 6A and 6B depict example display pages used in various alternate embodiments.

FIG. 6A depicts an example list window 100 to be displayed to the user 40 via UI devices 38 (e.g., on display 54) to allow the user 40 to select a particular storage system 32 to initialize. List window 100 displays list page 170 (e.g., within a web browser), which is an example list page 70. List page 170 includes a prompt 102 instructing the user 40 to choose a storage system 32 from list box 104. List box 104 lists the storage system identifiers 68 for all storage systems 32 for which discovery packets 42 were received. Because the discovery packets 42 are sent across network 34 using UDP, which is an unreliable protocol, the user may wish to re-scan for discovery packets 42 by pressing the scan button 106. If discovery packets are broadcast by storage systems every 5 seconds, then it takes just over 5 seconds from pressing the scan button 106 until the list box 104 is re-populated. In some embodiments, upon the user 40 pressing the scan button 106, management host 36 broadcasts a discovery request message to request that all uninitialized storage systems 32 re-broadcast their discovery acknowledgement packets 42. The user 40 is then able to select the particular storage system identifier 68 associated with the particular storage system 32 that he wishes to initialize from list box 104.

Figure 6B:
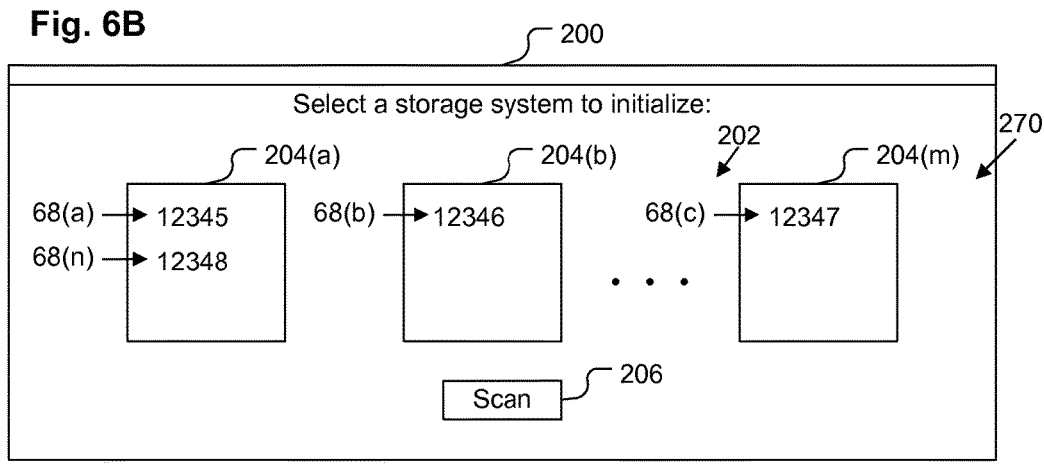

FIG. 6B depicts an example lists window 200 to be displayed to the user 40 via UI devices 38 (e.g., on display 54) to allow the user 40 to select a particular storage system 32 to initialize. Lists window 200 displays lists page 270 (e.g., within a web browser), which is an example lists page 70. Lists page 270 includes a prompt 102 instructing the user 40 to choose a storage system 32 from one of several list boxes 204 (depicted as list boxes 204(*a*), 204(*b*), . . . , 204(*m*)). Each list box 204 lists the storage system identifiers 68 for all storage systems 32 of a particular type for which discovery packets 42 were received. For example, list box 204(*a*) lists the storage system identifiers 68 for all VNX block-based systems (e.g., storage systems 32(*a*), 32(*n*)) for which discovery packets 42 were received, list box 204(*b*) lists the storage system identifiers 68 for all VNXe systems (e.g., storage system 32(*b*)) for which discovery packets 42 were received, and list box 204(*m*) lists the storage system identifiers 68 for all VNX file-based systems (e.g., storage system 32(*c*)) for which discovery packets 42 were received. Thus, the identifiers 68 are distributed between various list boxes 204, making it easier for the user 40 to decide which identifier 68 to select (for example, if the user 40 wants to select particular system types first). The user 40 is then able to select the particular storage system identifier 68 associated with the particular storage system 32 that he wishes to initialize from one of the list boxes 204.

Because the discovery packets 42 are sent across network 34 using UDP, which is an unreliable protocol, the user may wish to re-scan for discovery packets 42 by pressing the scan button 206. If discovery packets are broadcast by storage systems every 5 seconds, then it takes just over 5 seconds from pressing the scan button 206 until the list boxes 204 are re-populated. In some embodiments, upon the user 40 pressing the scan button 206, management host 36 broadcasts a discovery request message to request that all uninitialized storage systems 32 re-broadcast their discovery acknowledgement packets 42.

Management host 36 is able to distinguish between storage system types by looking at the format of each received discovery packet 42, since the formats differ between different storage system types. Thus, for example, management host 36 may identify discovery packets 42(*a*), 42(*n*) having encoded markup tags similar to those shown in FIG. 3 as belonging to VNX block-based systems, while management host 36 may identify discovery packets 42(*b*), 42(*c*) having un-encoded name-value pairs as belonging to either VNX file-based systems or VNXe systems. Management host 36 may further be able to distinguish between VNX file-based systems and VNXe systems by looking for the presence of a fileserver variable 92 definition.

Figure 7A:
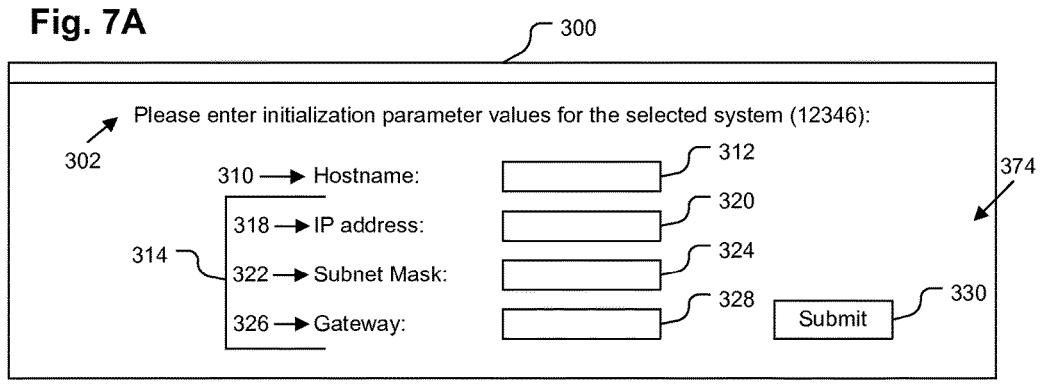

FIG. 7A depicts an example selection window 300 to be displayed to the user 40 via UI devices 38 (e.g., on display 54) to query the user 40 to supply initialization parameter values when the system selection 72 represents a particular VNXe system. Selection window 300 displays selection page 374 (e.g., within a web browser), which is an example selection page 74. Selection page 374 includes a prompt 302 instructing the user 40 to enter initialization parameters for the selected 72 particular VNXe storage system 32(*b*) to initialize (e.g., having serial number 12346).

Selection page 374 also includes queries that allow the user 40 to enter a minimal amount of initialization information that could be used to initialize the selected 72 particular storage system 32 in a meaningful manner. Since the selected 72 particular storage system 32(*b*) is a VNXe storage system, selection page 374 includes various input boxes 312, 320, 324, 328, which allow the user 40 to enter, via UI devices 38 (e.g., keyboard 56) a hostname 310 in box 312 and various network address parameters 314 associated with a management console of the selected 72 VNXe system 32(b) in boxes 320, 324, 328. Network address parameters 314 may include, for example, an IP address 318, a subnet mask 322, and a gateway server address 326. Selection page 374 also includes a submit button 330, which user 40 can press in order to submit the entered initialization parameters to be stored as selections 76 in memory 60.

FIG. 7B depicts an example selection window 400 to be displayed to the user 40 via UI devices 38 (e.g., on display 54) to query the user 40 to supply initialization parameter values when the system selection 72 represents a particular VNX block-based system. Selection window 400 displays selection page 474 (e.g., within a web browser), which is an example selection page 74. Selection page 474 includes a prompt 402 instructing the user 40 to enter initialization parameters for the selected 72 particular VNX block-based storage system 32(a) to initialize (e.g., having serial number 12345).

Selection page 474 also includes queries that allow the user 40 to enter a minimal amount of initialization information that could be used to initialize the selected 72 particular storage system 32 in a meaningful manner. Since the selected 72 particular storage system 32(a) is a VNX block-based storage system, selection page 474 includes selection box 408 and various input boxes 412(a, b), 420(a, b), 424(a), 428(a), which allow the user 40 to enter, via UI devices 38 (e.g., keyboard 56) initialization parameters for two storage processors, SP A and SP B, of the particular VNX block-based storage system 32(a), respectively, in columns 409(a) and 409(b). In column 409(a), user 40 may enter a hostname 410(a) for SP A in box 412(a) and various network address parameters 414(a) associated with SP A of the selected 72 VNX block-based storage system 32(a) in boxes 420(a), 424(a), 428(a). Network address parameters 414(a) may include, for example, an IP address 418(a), a subnet mask 422(a), and a gateway server address 426(a) for SP A. In column 409(b), user 40 may enter a hostname 410(b) for SP B in box 412(b) and various network address parameters 414(b) associated with SP B of the selected 72 VNX block-based storage system 32(a) in box 420(b). As depicted, the subnet mask 422(b) and gateway server address 426(b) of SP B are always identical to the subnet mask 422(a) and gateway server address 426(a) of SP B, and thus, input boxes for the subnet mask 422(b) and gateway server address 426(b) of SP B are omitted, however, in some embodiments, input boxes for the subnet mask 422(b) and gateway server address 426(b) of SP B may also be presented on page 474. Selection box 408 allows the user 40 to select between IPv4 and IPv6, which is a choice available for VNX block-based storage systems. Page 474, as depicted, shows choices based on a selection of IPv4—were IPv6 to be selected, slight modifications would have to be made to the query elements 410-428. Selection page 474 also includes a submit button 430, which user 40 can press in order to submit the entered initialization parameters to be stored as selections 76 in memory 60.

FIG. 7C depicts an example selection window 500 to be displayed to the user 40 via UI devices 38 (e.g., on display 54) to query the user 40 to supply initialization parameter values when the system selection 72 represents a particular VNX file-based system. Selection window 500 displays selection page 574 (e.g., within a web browser), which is an example selection page 74. Selection page 574 includes a prompt 502 instructing the user 40 to enter initialization parameter selections 76 for the selected 72 particular VNX file-based storage system 32(c) to initialize (e.g., having serial number 12347).

Selection page 574 also includes queries that allow the user 40 to enter a minimal amount of initialization information that could be used to initialize the selected 72 particular storage system 32 in a meaningful manner. Since the selected 72 particular storage system 32(a) is a VNX file-based storage system, selection page 574 includes selection box 508 and various input boxes 512(a, b), 520(a, b), 524(a), 528(a), which allow the user 40 to enter, via UI devices 38 (e.g., keyboard 56) initialization parameters for two storage processors, SP A and SP B, of the particular VNX file-based storage system 32(c), respectively, in columns 509(a) and 509(b). In column 509(a), user 40 may enter a hostname 510(a) for SP A in box 512(a) and various network address parameters 514(a) associated with SP A of the selected 72 VNX file-based storage system 32(c) in boxes 520(a), 524(a), 528(a). Network address parameters 514(a) may include, for example, an IP address 518(a), a subnet mask 522(a), and a gateway server address 526(a) for SP A. In column 509(b), user 40 may enter a hostname 510(b) for SP B in box 512(b) and various network address parameters 514(b) associated with SP B of the selected 72 VNX file-based storage system 32(c) in box 520(b). As depicted, the subnet mask 522(b) and gateway server address 526(b) of SP B are always identical to the subnet mask 522(a) and gateway server address 526(a) of SP B, respectively, and thus, input boxes for the subnet mask 522(b) and gateway server address 526(b) of SP B are omitted, however, in some embodiments, input boxes for the subnet mask 522(b) and gateway server address 526(b) of SP B may also be presented on page 574.

Since VNX file-based storage systems also include one or two control stations for managing the file system, selection page 574 also includes various input boxes 542(a, b), 550(a, b), 554(a), 558(a), which allow the user 40 to enter, via UI devices 38 (e.g., keyboard 56) initialization parameters for two control stations (primary and secondary), of the particular VNX file-based storage system 32(c), respectively, in columns 539(a) and 539(b). In column 539(a), user 40 may enter a hostname 540(a) for the primary control station in box 542(a) and various network address parameters 544(a) associated with the primary control station of the selected 72 VNX file-based storage system 32(c) in boxes 550(a), 554(a), 558(a). Network address parameters 544(a) may include, for example, an IP address 548(a), a subnet mask 552(a), and a gateway server address 556(a) for the primary control station. In column 539(b), user 40 may enter a hostname 540(b) for the secondary control station in box 542(b) and various network address parameters 544(b) associated with the secondary control station of the selected 72 VNX file-based storage system 32(c) in box 550(b). As depicted, the subnet mask 552(b) and gateway server address 556(b) of the secondary control station are always identical to the subnet mask 552(a) and gateway server address 556(a) of the secondary control station, respectively, and thus, input boxes for the subnet mask 552(b) and gateway server address 556(b) of the secondary control station are omitted, however, in some embodiments, input boxes for the subnet mask 552(b) and gateway server address 556(b) of the secondary control station may also be presented on page 574.

Selection box 508 allows the user 40 to select between IPv4 and IPv6, which is a choice available for VNX file-based storage systems. Selection page 574, as depicted, shows choices based on a selection of IPv4—were IPv6 to be selected, slight modifications would have to be made to the query elements 510-558. Selection page 574 also includes a submit button 530, which user 40 can press in order to submit the entered initialization parameters to be stored as selections 76 in memory 60.

FIG. 8 illustrates the operation of system 30 in detail according to various embodiments. It should be understood that any time a piece of software, such as, for example, configuration program 64, is described as performing a method, process, step, or function, in actuality what is meant is that the device on which the piece of software is running (e.g., management host 36 via operation of processor 58) performs the method, process, step, or function when executing that piece of software.

FIG. 8 illustrates, as method 600, the operation of system 30 once user 40 opens list window 100 or 200, or in response to user 40 pressing scan button 106 or 206.

In step 610, configuration program 64 receives, via network interface 52, a plurality of discovery packets 42 (typically broadcast UDP) from a plurality of storage systems 32 of a plurality of different types. Each different type of storage system 32 has a different minimal amount of configuration information required to initialize a storage system of that type. Thus, a VNXe storage system 32(b) may minimally require a single hostname 310 and network address parameters 314 before it can be properly initialized, while a VNX block-based storage system 32(a), 32(n) may require a protocol selection as well as a hostname 410 and network address parameters 414 for each of two storage processors before it can be properly initialized. Similarly, a VNX file-based storage system 32(c) may require a protocol selection as well as a hostname 510 and network address parameters 514 for each of two storage processors and a hostname 540 and network address parameters 544 for each of one or two control stations before it can be properly initialized.

In step 620, configuration program 64 displays list(s) page 70 to the user 40, via UI 50, the list(s) page 70 including an identifier 68 for each storage system 32 from which a discovery packet 42 was received. For example, configuration program 64 may cause display screen 54 to display list(s) page 170 or 270 in list(s) window 100 or 200, respectively. The particular identifiers 68 displayed in list box 104 or in list boxes 204 depends on what identifiers 68 have been received (and, in the case of lists page 270, what type of storage system 32 each identifier 68 corresponds to).

In step 630, configuration program 64 receives, via UI 50, from the user 40, a selection 72 of a particular storage system 32 for which an identifier 68 was displayed in step 620, e.g., in list box 104 or in list boxes 204. This selection 72 may be input by the user 40 via keyboard 56 or some other input device (e.g., a mouse) of the UI devices 38.

In step 640, configuration program 64 determines which type of storage system 32 the selected 72 storage system is, each type of storage system being associated with a distinct set of initialization parameter selection choices. The set of initialization parameter selection choices for each type of storage system reflects the minimal amount of configuration information required to initialize a storage system of that type.

In step 650, configuration program 64 displays selection page 74 to the user 40, via UI 50, the selection page 74 including the initialization parameter selection choices associated with the determined type of storage system. For example, configuration program 64 may cause display screen 54 to display selection page 374, 474, or 574 in selection windows 300, 400, or 500, respectively, depending which type of storage system 32 the selected 72 storage system is.

In step 660, configuration program 64 receives, via UI 50, from the user 40, initialization parameter selections 76 responsive to the displayed initialization parameter selection choices from step 650. For example, the received initialization parameter selections 76 may include the user-input contents of input boxes 312, 320, 324, and 328 if the selected 72 storage system is a VNXe storage system 32(b). Similarly, if the selected 72 storage system is a VNX block-based storage system 32(a), then the received initialization parameter selections 76 may include the user-input contents of selection box 408 and input boxes 412(a), 412(b), 420(a), 420(b), 424(a), and 428(a). Similarly, if the selected 72 storage system is a VNX file-based storage system 32(c), then the received initialization parameter selections 76 may include the user-input contents of selection box 508 and input boxes 512(a), 512(b), 520(a), 520(b), 524(a), 528(a), 542(a), 542(b), 550(a), 550(b), 554(a), and 558(a).

In step 670, configuration program 64 sends initialization command 44, via network interface 52, to the selected 72 particular storage system 32. The initialization command 44 includes the received initialization parameter selections 76 (or values based on the received initialization parameter selections 76) to allow the selected 72 particular storage system 32 to be properly initialized. Since the selected 72 particular storage system 32 has not yet been initialized with network address parameters 314, 414, 514, 544, configuration program 64 broadcasts the initialization command 44 over network 34 using UDP. In the case of a VNX block-based storage system 32(a), 32(n) or VNX file-based storage system 32(c), each storage processor (and each control station) of the selected 72 particular storage system 32 may individually receive the broadcast initialization command 44 and then use the appropriate initialization parameter selections 76 to initialize itself.

Once the selected 72 particular storage system 32 has been initialized (or, in some embodiments, once each storage processor or control station of the selected 72 particular storage system 32 has been initialized), that storage system 32 (or storage processor or control station) may send back a confirmation signal indicating that it has been properly initialized. Thus, in optional step 680, configuration program 64 receives this confirmation signal via network interface 52. Configuration program 64 may then display details of this confirmation to the user 40, via UI 50 (e.g., on display 54) so that the user 40 can be sure that the initialization proceeded correctly.

In optional step 690, once configuration program 64 receives the confirmation signal via network interface 52 indicating that the selected 72 particular storage system 32 has been properly initialized, configuration program 64 may open a connection (e.g., using a web browser) to a storage system management application (e.g., the Unisphere application produced by EMC) running on the selected 72 particular storage system 32, which allows the user 40 to remotely communicate with that now-initialized storage system 32 over network 34 and to perform additional configuration and management functions with respect to that storage system 32.

Thus, techniques have been described for a user 40 (e.g., an enterprise administrator) to initialize a diverse collection of data storage systems 32 from a single unified initialization utility (e.g., configuration program 64). The unified initialization utility receives discovery packets 42 from the diverse collection of data storage systems 32 and intelligently determines which type of storage system 32 a particular storage system is. The unified initialization utility then queries the administrator for the proper initialization parameters 76 for a storage system of that type, prior to sending an initialization command 44 in the proper format for a storage system of that type.

While various embodiments of the present disclosure have been particularly shown and described, it will be understood by those skilled in the art that various changes in form and details may be made therein without departing from the spirit and scope of the present disclosure as defined by the appended claims.

For example, it should be understood that, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. § 102, such determination being a legal determination that depends upon many factors, not all of which are known to Applicants at this time.

What is claimed is:

1. A method performed by a management computer, the method comprising:
    receiving, at the management computer, via a network connection, from a plurality of storage systems of a plurality of different types, a plurality of discovery packets, each different type of storage system having a different minimal amount of configuration information required to initialize a storage system of that type, wherein receiving the plurality of discovery packets includes receiving a first discovery packet having a first format associated with a first type of storage system of the plurality of different types and receiving a second discovery packet having a second format associated with a second type of storage system of the plurality of different types, the first format and the second format being distinct;
    displaying, to a user of the management computer, an identifier for each storage system from which a discovery packet was received by:
        displaying, on a first list, the identifier for storage systems of a first type of the plurality of different types for which a discovery packet was received; and
        displaying, on a second list, the identifier for storage systems of a second type of the plurality of different types for which a discovery packet was received, the first list and the second list being displayed in separate locations;
    receiving, at the management computer, from the user, a selection of a particular storage system for which an identifier was displayed;
    determining, at the management computer, which type of storage system the selected storage system is, each type of storage system being associated with a distinct set of initialization parameter selection choices, the set of initialization parameter selection choices for each type of storage system reflecting the minimal amount of configuration information required to initialize a storage system of that type, wherein determining which type of storage system the selected storage system is includes:
        identifying a received discovery packet associated with the selected storage system;
        selecting the first type of storage system if the identified discovery packet has the first format; and
        selecting the second type of storage system if the identified discovery packet has the second format;
    displaying the initialization parameter selection choices associated with the determined type of storage system to the user of the management computer;
    receiving, at the management computer, from the user, initialization parameter selections responsive to the displayed initialization parameter selection choices; and
    sending an initialization command from the management computer to the selected particular storage system via the network connection, the initialization command including the received initialization parameter selections to allow the selected particular storage system to be properly initialized.

2. The method of claim 1 wherein the first discovery packet having the first format has data stored in an encoded tag format and the second discovery packet having the second format has data stored in a set of name-value pairs.

3. The method of claim 1 wherein displaying the initialization parameter selection choices associated with the determined type of storage system to the user of the management computer includes displaying initialization parameter selection choices for initialization parameters of the minimal amount of configuration information required to initialize a storage system of that type.

4. The method of claim 3 wherein displaying initialization parameter selection choices for initialization parameters of the minimal amount of configuration information required to initialize a storage system of that type includes:
    if the determined type of storage system is the first type of storage system, then displaying to the user of the management computer selection choices for the following initialization parameters:
        hostname of a management console of the particular storage system; and
        network address parameters of the management console of the particular storage system; and
    if the determined type of storage system is the second type of storage system, then displaying to the user of the management computer selection choices for the following initialization parameters:
        hostname of a first storage processor of the particular storage system;
        network address parameters of the first storage processor of the particular storage system;
        hostname of a second storage processor of the particular storage system, the second storage processor being distinct from the first storage processor; and
        network address parameters of the second storage processor of the particular storage system.

5. The method of claim 4 wherein displaying initialization parameter selection choices for initialization parameters of the minimal amount of configuration information required to initialize a storage system of that type further includes, if the determined type of storage system is a third type of storage system of the plurality of different types, then displaying to the user of the management computer selection choices for the following initialization parameters:
hostname of a first storage processor of the particular storage system;
network address parameters of the first storage processor of the particular storage system;
hostname of a second storage processor of the particular storage system, the second storage processor being distinct from the first storage processor;
network address parameters of the second storage processor of the particular storage system;
hostname of a file system control station of the particular storage system; and
network address parameters of the file system control station of the particular storage system.

6. The method of claim 4 wherein displaying initialization parameter selection choices for initialization parameters of the minimal amount of configuration information required to initialize a storage system of that type further includes, if the determined type of storage system is the second type of storage system, then further displaying to the user of the management computer a selection choice for the following initialization parameter:
version of the Internet Protocol to use.

7. The method of claim 1 wherein the method further includes, after sending the initialization command:
receiving, at the management computer, via the network connection, confirmation that the selected particular storage system has been properly initialized; and
launching a connection between the management computer and management software running on the selected particular storage system to allow the user to manage the selected particular storage system.

8. The method of claim 1 wherein:
each storage system of the plurality of storage systems is a device including data storage that that storage system makes available over the network connection; and
the plurality of storage systems includes:
a first storage system of a first type, the first storage system being configured to make its data storage available using a block-based protocol; and
a second storage system of a second type, the second storage system being configured to make its data storage available using a file-based protocol.

9. The method of claim 1 wherein determining which type of storage system the selected storage system is is performed prior to displaying the initialization parameter selection choices associated with the determined type of storage system to the user of the management computer.

10. The method of claim 1 wherein the first list and the second list are displayed in the separate locations simultaneously.

11. An apparatus comprising:
a network interface;
a user interface (UI); and
a controller, the controller being configured to:
receive, via the network interface, from a plurality of storage systems of a plurality of different types, a plurality of discovery packets, each different type of storage system having a different minimal amount of configuration information required to initialize a storage system of that type, wherein receiving the plurality of discovery packets includes receiving a first discovery packet having a first format associated with a first type of storage system of the plurality of different types and receiving a second discovery packet having a second format associated with a second type of storage system of the plurality of different types, the first format and the second format being distinct;
display, to a user via the UI, an identifier for each storage system from which a discovery packet was received by:
displaying, on a first list, the identifier for storage systems of a first type of the plurality of different types for which a discovery packet was received; and
displaying, on a second list, the identifier for storage systems of a second type of the plurality of different types for which a discovery packet was received, the first list and the second list being displayed in separate locations;
receive, from the user via the UI, a selection of a particular storage system for which an identifier was displayed;
determine which type of storage system the selected storage system is, each type of storage system being associated with a distinct set of initialization parameter selection choices, the set of initialization parameter selection choices for each type of storage system reflecting the minimal amount of configuration information required to initialize a storage system of that type, wherein determining which type of storage system the selected storage system is includes:
identifying a received discovery packet associated with the selected storage system;
selecting the first type of storage system if the identified discovery packet has the first format; and
selecting the second type of storage system if the identified discovery packet has the second format;
display the initialization parameter selection choices associated with the determined type of storage system to the user via the UI;
receive, from the user via the UI, initialization parameter selections responsive to the displayed initialization parameter selection choices; and
send an initialization command to the selected particular storage system via the network interface, the initialization command including the received initialization parameter selections to allow the selected particular storage system to be properly initialized.

12. A computer program product comprising a non-transitory computer-readable storage medium storing instructions, which, when executed by a computer, cause the computer to:
receive, via a network connection, from a plurality of storage systems of a plurality of different types, a plurality of discovery packets, each different type of storage system having a different minimal amount of configuration information required to initialize a storage system of that type, wherein receiving the plurality of discovery packets includes receiving a first discovery packet having a first format associated with a first type of storage system of the plurality of different types and receiving a second discovery packet having a second format associated with a second type of storage system of the plurality of different types, the first format and the second format being distinct;
display, to a user of the computer, an identifier for each storage system from which a discovery packet was received by causing the computer to:

display, on a first list, the identifier for storage systems of a first type of the plurality of different types for which a discovery packet was received; and display, on a second list, the identifier for storage systems of a second type of the plurality of different types for which a discovery packet was received, the first list and the second list being displayed in separate locations;

receive, from the user, a selection of a particular storage system for which an identifier was displayed;

determine which type of storage system the selected storage system is, each type of storage system being associated with a distinct set of initialization parameter selection choices, the set of initialization parameter selection choices for each type of storage system reflecting the minimal amount of configuration information required to initialize a storage system of that type, wherein determining which type of storage system the selected storage system is includes:

identifying a received discovery packet associated with the selected storage system;

selecting the first type of storage system if the identified discovery packet has the first format; and selecting the second type of storage system if the identified discovery packet has the second format;

display the initialization parameter selection choices associated with the determined type of storage system to the user of the computer;

receive, from the user, initialization parameter selections responsive to the displayed initialization parameter selection choices; and send an initialization command from the computer to the selected particular storage system via the network connection, the initialization command including the received initialization parameter selections to allow the selected particular storage system to be properly initialized.

13. The computer program product of claim 12 wherein the first discovery packet having the first format has data stored in an encoded tag format and the second discovery packet having the second format has data stored in a set of name-value pairs.

14. The computer program product of claim 12 wherein the instructions, when executed by the computer, cause the computer to, when displaying the initialization parameter selection choices associated with the determined type of storage system to the user of the computer, display initialization parameter selection choices for initialization parameters of the minimal amount of configuration information required to initialize a storage system of that type.

15. The computer program product of claim 14 wherein the instructions, when executed by the computer, cause the computer to, when displaying initialization parameter selection choices for initialization parameters of the minimal amount of configuration information required to initialize a storage system of that type:

if the determined type of storage system is the first type of storage system, then display to the user of the computer selection choices for the following initialization parameters:

hostname of a management console of the particular storage system; and network address parameters of the management console of the particular storage system; and if the determined type of storage system is the second type of storage system, then display to the user of the computer selection choices for the following initialization parameters:

hostname of a first storage processor of the particular storage system;

network address parameters of the first storage processor of the particular storage system;

hostname of a second storage processor of the particular storage system, the second storage processor being distinct from the first storage processor; and network address parameters of the second storage processor of the particular storage system.

16. The computer program product of claim 15 wherein the instructions, when executed by the computer, cause the computer to, when displaying initialization parameter selection choices for initialization parameters of the minimal amount of configuration information required to initialize a storage system of that type, if the determined type of storage system is a third type of storage system of the plurality of different types, then display to the user of the computer selection choices for the following initialization parameters:

hostname of a first storage processor of the particular storage system;

network address parameters of the first storage processor of the particular storage system;

hostname of a second storage processor of the particular storage system, the second storage processor being distinct from the first storage processor;

network address parameters of the second storage processor of the particular storage system;

hostname of a file system control station of the particular storage system; and network address parameters of the file system control station of the particular storage system.

17. The computer program product of claim 12 wherein the instructions, when executed by the computer, further cause the computer to, after sending the initialization command:

receive, via the network connection, confirmation that the selected particular storage system has been properly initialized; and launch a connection between the computer and management software running on the selected particular storage system to allow the user to manage the selected particular storage system.

* * * * *